United States Patent
Cluff et al.

(10) Patent No.: US 6,496,891 B1
(45) Date of Patent: Dec. 17, 2002

(54) DEVICE AND METHOD TO EMULATE INTERRUPTS TO PROVIDE PS/2 MOUSE AND KEYBOARD FUNCTIONALITY FOR A USB MOUSE KEYBOARD

(75) Inventors: Dean Kaye Cluff, Beaverton, OR (US); Robert Patrick Hale, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,030

(22) Filed: Dec. 30, 1999

(51) Int. Cl.[7] .......................... G06F 13/24; G06F 13/00
(52) U.S. Cl. ...................... 710/260; 710/63; 703/24
(58) Field of Search .................. 710/1, 62, 63, 710/73, 100, 260, 305, 48; 703/23–25; 713/1; 709/300, 301; 711/100; 712/32; 345/163; 341/22

(56) References Cited

U.S. PATENT DOCUMENTS 6,067,589 A * 5/2000 Mamata
6,070,204 A * 5/2000 Poisner
6,216,183 B1 * 4/2001 Rawlins
6,308,239 B1 * 10/2001 Osakada et al.

* cited by examiner

Primary Examiner—Gopal C. Ray
(74) Attorney, Agent, or Firm—Antonelli, Terry, Stout & Kraus, LLP

(57) ABSTRACT

A device and method for generating interrupts to a central processing unit (CPU) for an universal serial bus (USB) keyboard and an USB mouse so that an operating system will treat these interrupts as if caused by an IBM™ personal computer series (PS/2) keyboard and PS/2 mouse. An interrupt request (IRQ) register having a first bit and a second bit is used to trigger the interrupts. A first merge unit acting as an OR circuit is connected to the first bit of the IRQ register to generate an interrupt to the CPU when the first bit is set to one. A second merge unit also acting as an OR circuit is connected to the second bit of the IRQ register to generate an interrupt to the CPU when the second bit is set to one.

18 Claims, 13 Drawing Sheets

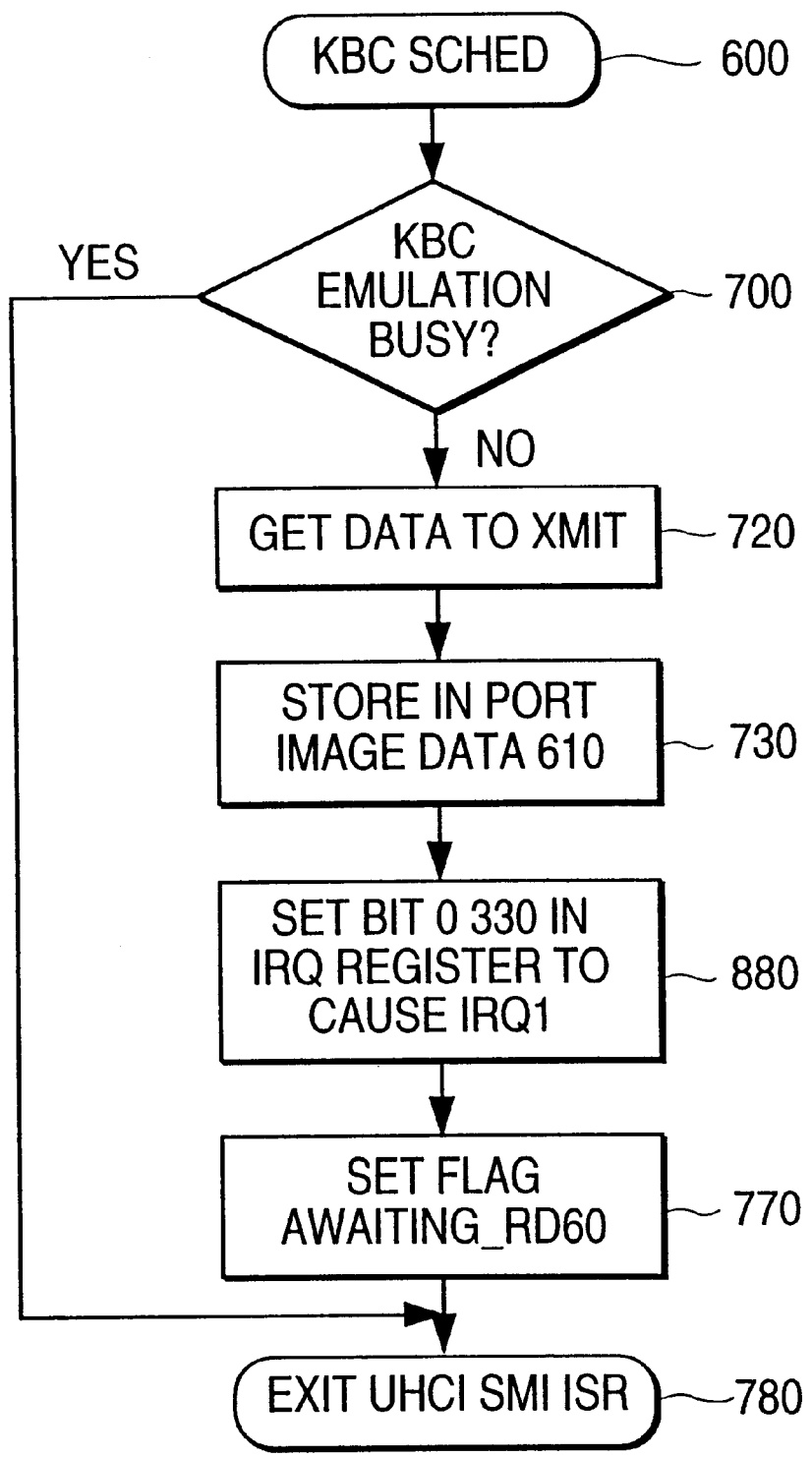

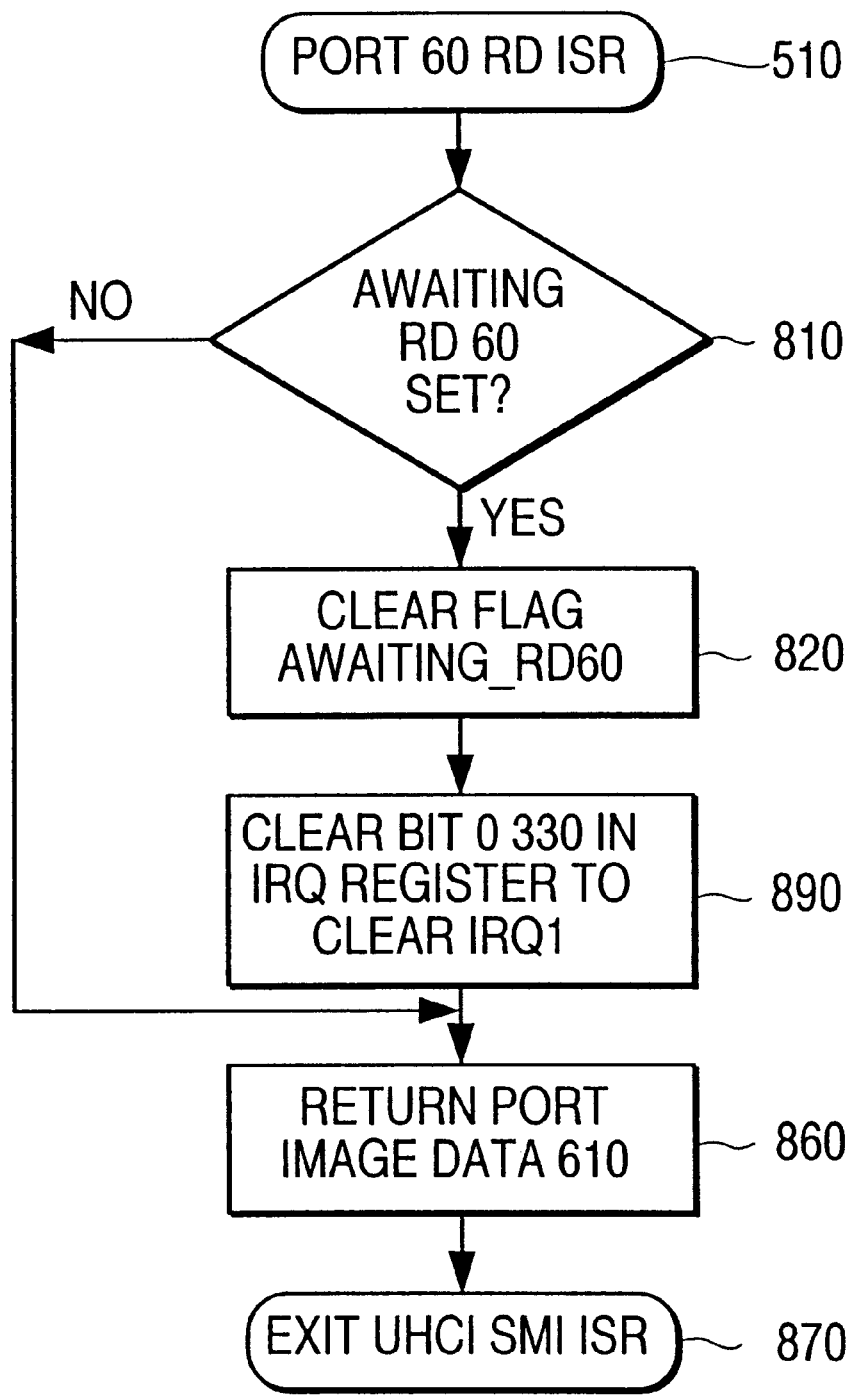

DEVICE AND METHOD TO EMULATE INTERRUPTS TO PROVIDE PS/2 MOUSE AND KEYBOARD FUNCTIONALITY FOR A USB MOUSE KEYBOARD

FIELD

The invention relates to a device and method to emulate interrupts in order to provide IBM™ Personal Computer Series (PS/2) mouse and PS/2 keyboard functionality for an universal serial bus (USB) mouse and USB keyboard.

BACKGROUND

Microprocessor-based systems have recently begun using USB as a form of interface to USB peripheral devices such as disk drives, printers, modems, keyboards and a mouse. With the addition of additional equipment, such as one or more USB hubs, a single USB controller may support up to 127 devices in a computer system. Further, using the more advanced operating systems, such as Windows 2000™, it is possible to plug an USB device into any USB port on an USB or USB hub and the operating system will, upon activation of the computer system, identify each device and interface connected to it. Therefore, the user, having a computer system with an USB and advanced operating system, no longer need be concerned with plugging each component into the proper port, which simplifies installing USB peripheral devices.

However, manufacturers of computer base boards face a problem in that the computer base boards must not only support the newer operating systems, such as Windows 2000™, but also the older operating systems such as DOS, Windows 3.1™, Windows NT™, and Windows 95™. Further, since the users of these older operating systems often are using older peripherals such as a PS/2 keyboard and PS/2 mouse, it is necessary to provide support on the computer base board for both an USB keyboard and USB mouse as well as a PS/2 keyboard and PS/2 mouse, which may both be supported by operating systems such as Windows 98™. However, in order to provide support for both an USB keyboard and USB mouse as well as a PS/2 keyboard and PS/2 mouse, separate controllers and ports have heretofore been required for each. This requires the use of significant space on the computer base board which could be used to support other functions.

In addition, when using the older operating systems with an USB keyboard and USB mouse, interrupts must be generated to the central processing unit (CPU) which cause the USB keyboard and USB mouse to be recognized and treated as if they were a PS/2 keyboard and PS/2 mouse. This requires the controller for the USB keyboard and USB mouse to communicate with the controller for the PS/2 mouse and PS/2 keyboard so that the controller for the PS/2 mouse and PS/2 keyboard can generate an interrupt to the CPU. This requires additional logic on the computer base board and further use of the limited space on that computer base board at the cost of that space being unavailable for other functions. The presence of the controller for the PS/2 keyboard and PS/2 mouse is still required even when only an USB keyboard and USB mouse are used on the computer system, due to the requirement of supporting the older operating systems discussed above. Therefore, due to the need to support older operating systems, a significant amount of space and logic and significant financial investment is required to support an USB mouse and an USB keyboard on a computer base board. This increases the cost of the computer base board and limits the addition of features that may be more desirable.

Therefore, what is needed is a device and method that will emulate interrupts so that an USB keyboard and USB mouse will appear and be treated by the older operating systems as if they were a PS/2 keyboard and PS/2 mouse. This emulation of interrupts should not require the presence of a controller for a PS/2 mouse and PS/2 keyboard. Using this device and method of interrupt emulation, a significant savings in space used on computer base board and the cost of the computer base board should be achieved by eliminating the controller for a PS/2 keyboard and a PS/2 mouse used to generate interrupts as well as the ports required by a PS/2 mouse and PS/2 keyboard while maintaining compatibility with the older operating systems.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein:

FIG. 12 is a flowchart of the operations performed by the keyboard control scheduler shown in FIG. 11 as implemented on the computer base board shown in FIG. 6 of an embodiment of the present invention; and FIG. 13 is a flowchart of the operations performed by the port 60 RD ISR module shown in FIG. 11 as implemented on the computer base board shown in FIG. 6 of an embodiment of the present invention.

DETAILED DESCRIPTION

Figure 1:
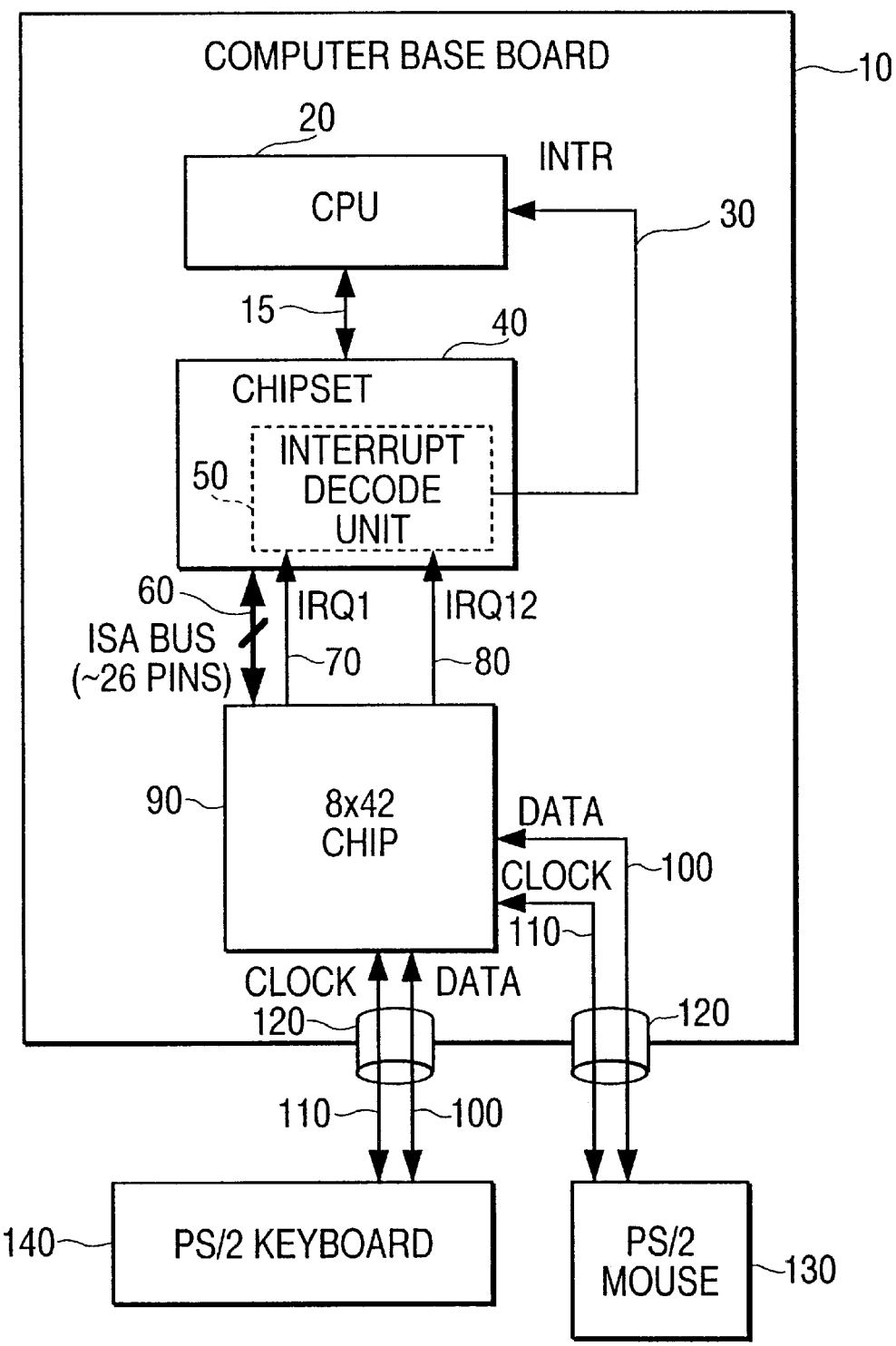
FIG. 1 is an example of an overall system diagram showing a computer base board interfacing to a PS/2 keyboard and mouse.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same. As a final note, well-known power connections to integrated circuits and other components may not be shown within the FIGS. for simplicity of illustration and discussion, and so as not to obscure the invention.

Due to the complexity of the process leading to the creation of the present invention, the figures and associated discussion herein provided will start with a simple representation, as shown in FIG. 1, and will add additional features and components until example embodiments of the present inventions are shown in FIGS. 6, 7 and 11–13. Therefore, FIGS. 1–5 and 8–10 and their associated descriptions are provided as a means of explaining the present invention, and are not intended to limit the scope of the present invention.

FIG. 1 illustrates a system diagram showing a computer base board (often referred to as a mother board) 10 interfacing with a PS/2 keyboard 140 and PS/2 mouse 130. Both the PS/2 keyboard 140 and PS/2 mouse 130 may interface [to] with the computer base board 10 through I/O ports 120, each using a data line 100 and a clock line 110. The respective data lines 100 and clock lines 110 may interface with an 8x42 chip 90 which may be either an Intel 8042™ chip, an Intel 8742™ chip, or other suitable PS/2 keyboard 140 and PS/2 mouse 130 controller. The 8x42 chip 90 upon the depression of a key on PS/2 keyboard 140 propagates a signal on interrupt request 1 (IRQ1) link 70 and propagates a signal on IRQ12 link 80 when PS/2 mouse 120 is moved. The 8x42 chip 90 also interfaces with industry standard architecture (ISA) bus 60 to supply other required data to and from chipset 40. Contained within chipset 40 may be an interrupt decode unit 50 which, upon receipt of a signal from either IRQ1 link 70 or IRQ12 link 80, generates an interrupt 30 to central processing unit or processor (CPU) 20. Communication lines 15 also exist between CPU 20 and chipset 40 that allow for additional two-way communications.

Figure 2:
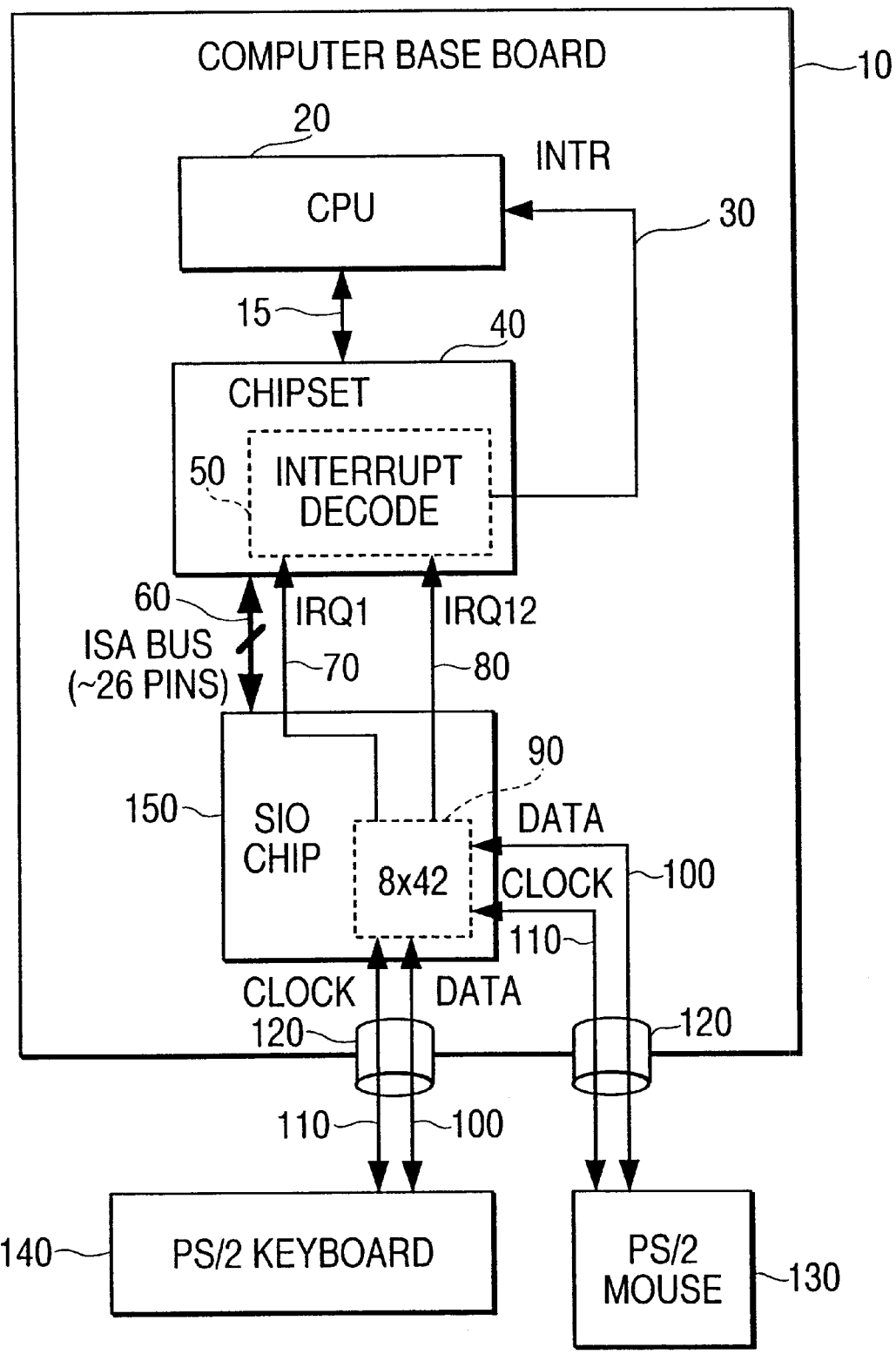
FIG. 2 is another example of an overall system diagram showing a computer base board interfacing to a PS/2 keyboard and mouse.

FIG. 2 shows a system diagram identical to that shown in FIG. 1 except that the 8x42 chip 90 may now be incorporated within a super input/output (SIO) chip 150. This SIO chip 150 also serves to interface with other peripheral devices (not shown) in addition to the PS/2 keyboard 140 and PS/2 mouse 130. Otherwise, all other components shown in FIG. 2 operate in the same manner as that described in reference to FIG. 1.

Figure 3:
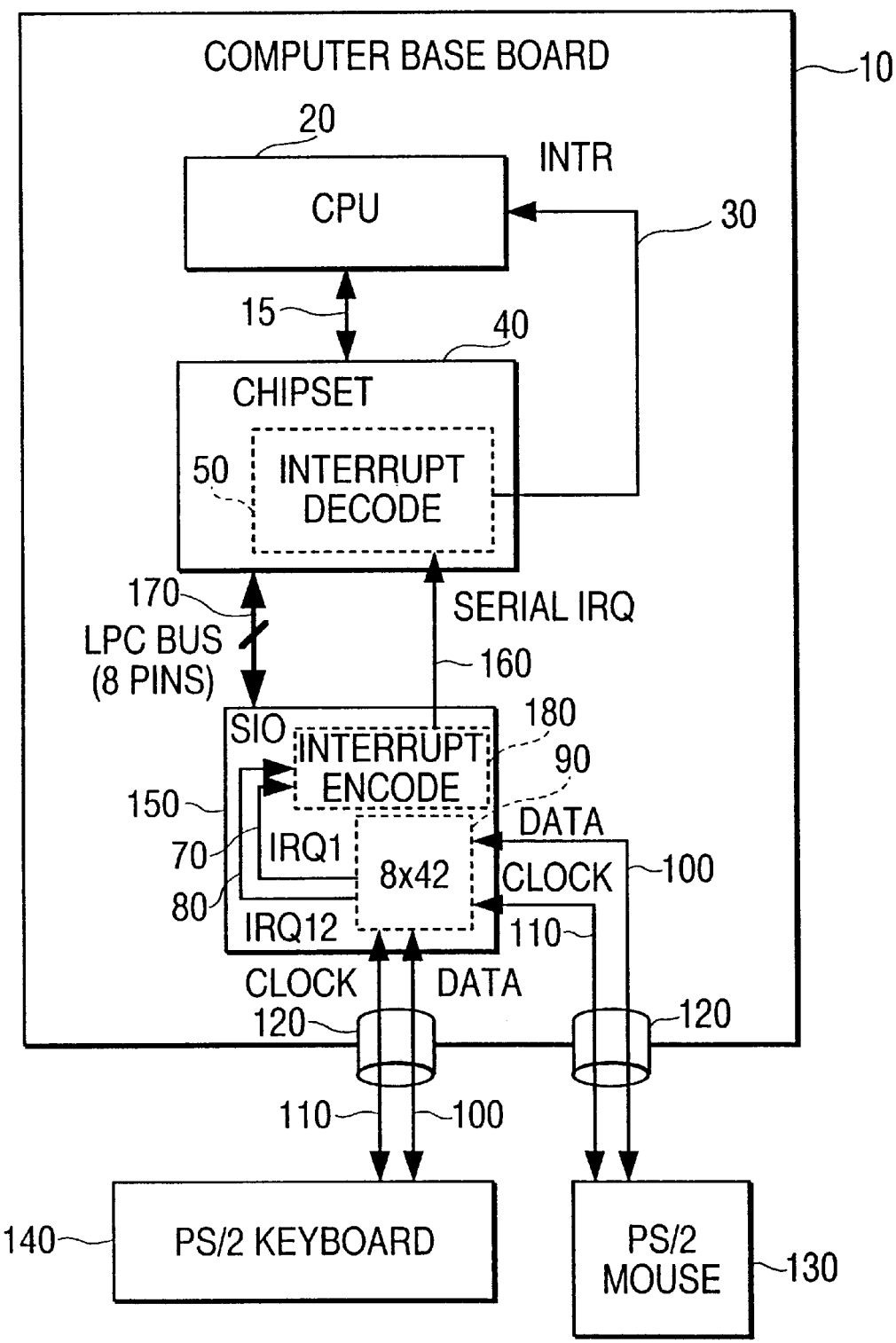
FIG. 3 is still another an example of overall system diagram showing a computer base board interfacing to a PS/2 keyboard and mouse.

FIG. 3 shows a system diagram substantially identical to that shown in FIG. 2 with several notable exceptions, all of which are designed to reduce the amount of space used on computer base board 10. These exceptions include an interrupt encode unit 180 embedded in the SIO chip 150 in which the IRQ1 link 70 and IRQ12 link 80 signals may be connected. The interrupt encode unit 180 may take all the interrupt signals from the SIO chip 150, including those from IRQ1 link 70 and IRQ12 link 80, and transmit them in a serial manner to the interrupt decode unit 50 via a single serial interrupt request (IRQ) line 160. In this way, separate lines are not required for each interrupt signal generated by the SIO chip 150, and a considerable savings in space on the computer base board 10 is seen. To further save on computer base board 10 space, a low pin count (LPC) bus 170 may be used instead of the ISA bus 60. Otherwise, all other components and their functions remain the same as described in FIG. 2, with the exception of interrupt decode unit 50 which is further described with reference to FIG. 5.

Figure 4:
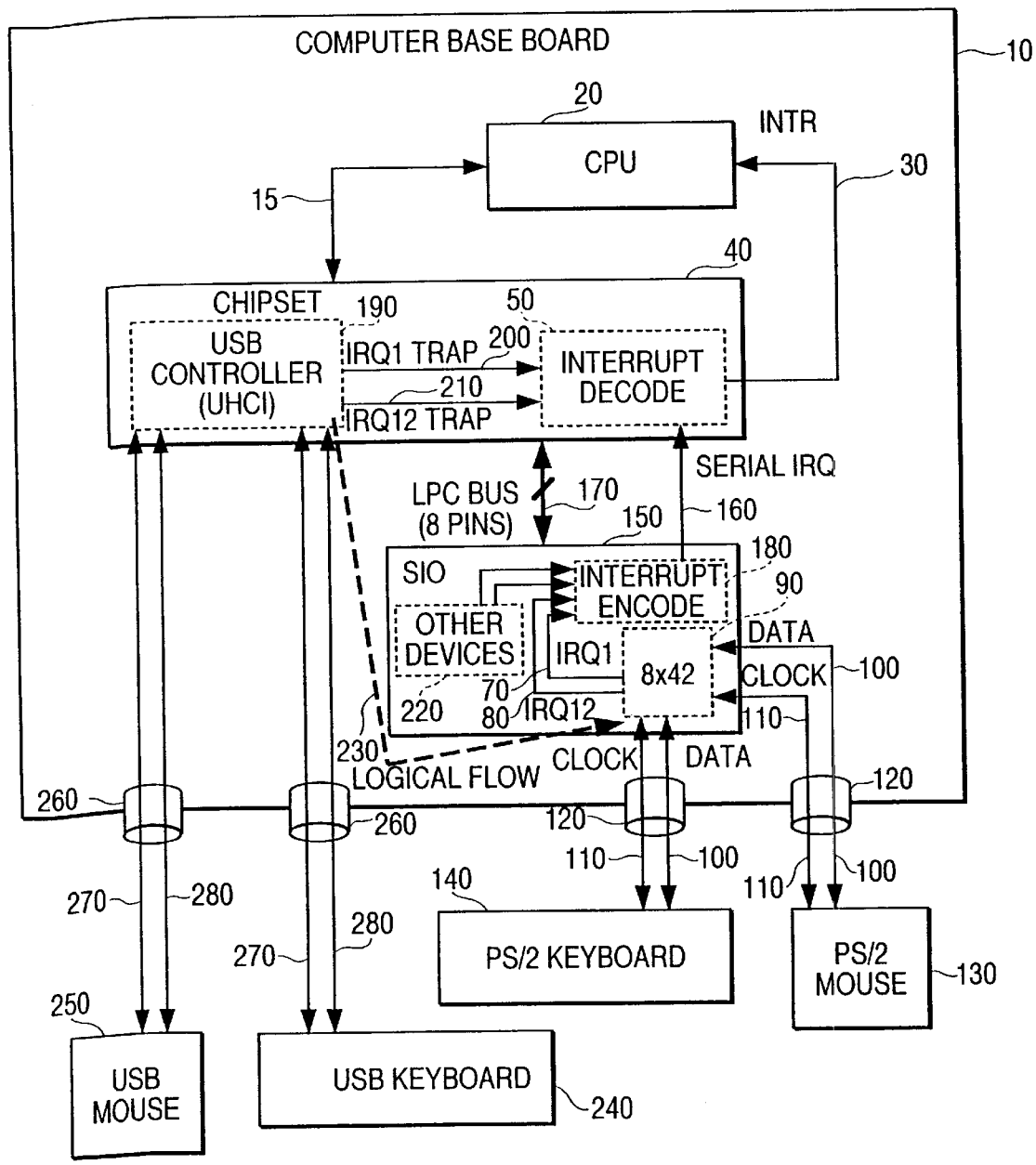
FIG. 4 is an example of an overall system diagram showing a computer base board interfacing to both a PS/2 keyboard and mouse and a USB keyboard and mouse.

FIG. 4 illustrates further additions to the components shown in FIG. 3 which may be supportable by a Windows 98™ operating system. These additions include, most notably, the addition of a USB mouse 250 and a USB keyboard 240. Also, A other devices 220 may be supported by SIO chip 150 and generate interrupts through an interrupt encode unit 180. The USB mouse 250 and USB keyboard 240 may communicate with a USB controller, referred to as a universal host controller interface (UHCI) 190 located in the chipset 40, via first USB link 270 and second USB link 280 through USB ports 260. The combination of a first USB link 270 and a second USB link 280, along with a voltage and ground line (not shown), form a USB port 260. Further, each USB port 260 may have, but is not required to have, one or more USB hubs (not shown) attached thereto which may allow for the support of up to 127 devices by the UHCI 190. The respective first USB links 270 and second USB links 280 may communicate to UHCI 190, which also supports other devices (not shown). When a key is pressed on the USB keyboard 240 or the USB mouse 250 is moved, a system management interrupt (SMI) 25 may be sent by the UHCI 190 to the CPU 20 as discussed ahead. Upon detection of a key being pressed in USB keyboard 240, the UHCI 190 performs two operations. Specifically, IRQ1 trap link 200 may be set by UHCI 190 which may be detected by interrupt decode unit 50. The operation of the interrupt decode unit 50 is explained in greater detail ahead in reference to FIG. 5. Further, UHCI 190 may generate signals to be sent to 8x42 chip 90 through logical flow 230, which may cause an interrupt to be generated on IRQ1 link 70. The combination of the UHCI 190 setting IRQ1 trap link 200 and sending signals to the 8x42 chip 90 via logical flow 230 may ultimately cause the generation of an interrupt 30 to CPU 20. The setting of IRQ1 trap link 200, logical flow 230, the generating of an interrupt on IRQ1 link 70 and the operation of interrupt decode unit 50 will be further detailed in reference to FIGS. 5 and 8–10. Upon detection of movement of USB mouse 250, the UHCI 190 again performs two operations. Specifically, IRQ12 trap link 210 may be set by UHCI 190, and signals may be sent to 8x42 chip 90 through logical flow 230. The combination of the UHCI 190 setting IRQ12 trap link 210 and sending signals to 8x42 chip 90 via logical flow 230 may ultimately cause the generation of an interrupt 30 to CPU 20 via IRQ12 link 80. The setting of IRQ12 trap link 210, logical flow 230, the generating of an interrupt on IRQL12 link 80 and the operation of interrupt decode unit 50 will be further detailed ahead in reference to FIGS. 5 and 8–10.

In FIG. 4, communications are required between UHCI 190 and 8x42 chip 90 via logical flow 230 in order for the USB mouse 250 and USB keyboard 240 to generate interrupt 30. This is because the older operating systems must view and treat the USB keyboard 240 and USB mouse 250 as if they are a PS/2 keyboard 140 and PS/2 mouse 130. Therefore, in order for a USB mouse 250 and USB keyboard 240 to operate using the older operating systems discussed above, an 8×42 chip 90 and a logical flow 230 are both required, which utilize space on the computer base board 10 and increase the complexity of the logic involved as well as the cost of the system. It is due to the requirement that the 8×42 chip 90 is required to produce an interrupt 30 for the USB keyboard 240 and USB mouse 250 as if that interrupt was due to the presence of a PS/2 mouse 130 and PS/2 keyboard 140.

Figure 5:
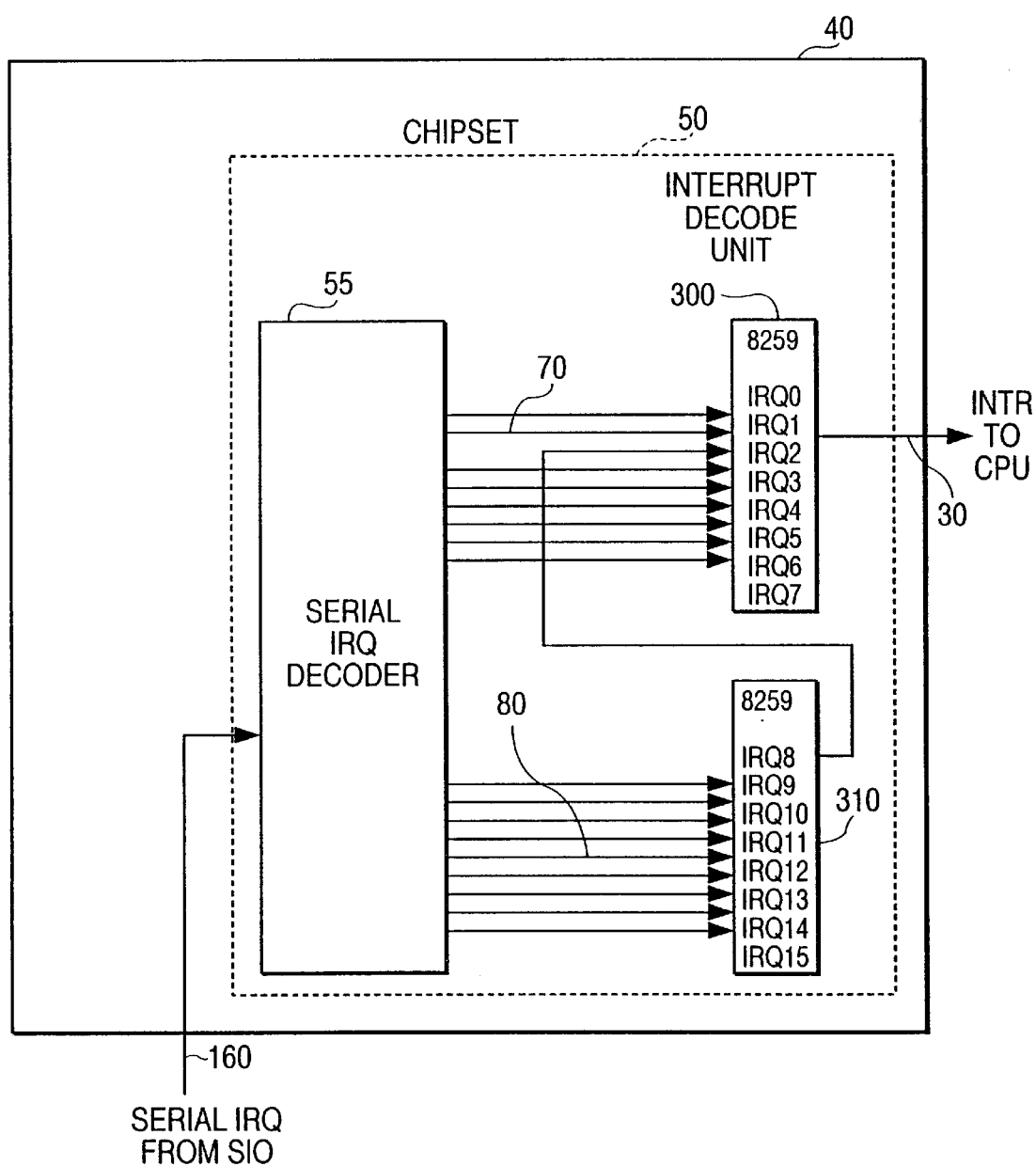
FIG. 5 is a diagram showing further details of a chip set and a interrupt decode unit shown in FIG. 3 and FIG. 4.

FIG. 5 is a diagram showing further detail of the chip set 40 and particularly the interrupt decode unit 50 shown in FIG. 3 and FIG. 4. The interrupt decode unit 50 may receive a serialized signal over serial IRQ 160 and, based on the timing of the cycles in the signal, the interrupt decode unit 50 may be able to identify which device requires an interrupt 30 to be generated to CPU 20. For example, if a key is pressed on the PS/2 keyboard 140, the serial IRQ decoder 55 sets IRQ1 link 70 high. This IRQ1 link 70 may be detected by a first 8259 chip 300, and an interrupt 30 may be generated to CPU 20 by the first 8259 chip 300. If the PS/2 mouse 130 is moved, this may also be detected by the serial IRQ decoder 55, which sets IRQ12 link 80 to one (high). This high state of IRQ12 link 80 may be detected by a second 8259 chip 310, which then may generate a signal which may be fed back into first 8259 chip 300 that in turn generates an interrupt 30 to CPU 20.

Figure 6:
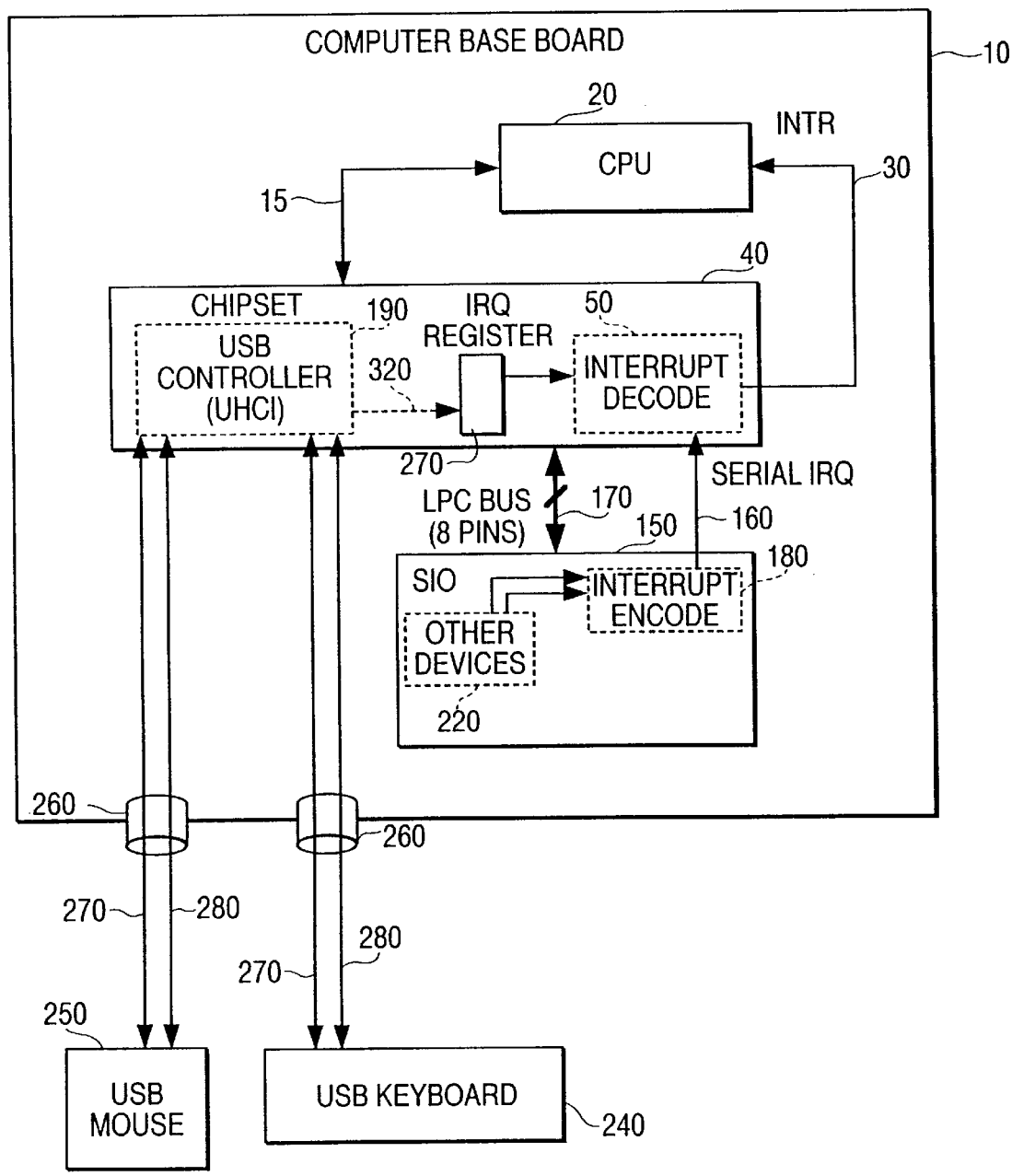
FIG. 6 is an example of an overall system diagram of an embodiment of the present invention showing a computer base board interfacing to a USB keyboard and mouse.

FIG. 6 is an example of overall system diagram of an example embodiment of the present invention showing a computer base board 10 interfacing with a USB keyboard 240 and USB mouse 250. It should be noted that, as with FIG. 4, the SIO chip 150 may still be present and may be used to interface to other devices 220. However, as compared to FIG. 4, the SIO chip 150 no longer contains within it an 8×42 chip 90 and also logical flow 230 between the USB controller, referred to as the UHCI 190, and 8×42 chip 90 is eliminated as well as the I/O ports 120 and the ability to communicate to a PS/2 keyboard 140 and PS/2 mouse 130 in the aforementioned manner. Instead, an IRQ register 290 may be used by UHCI 190 via IRQ register interface 320 to signal that either a key on USB keyboard 240 has been pressed or USB mouse 250 has been moved. The IRQ register 290 contains a plurality of bits which, when set, cause the interrupt decode unit 50 to generate an interrupt 30 to CPU 20. The operation of the IRQ register 290 and interrupt decode unit 50 are further detailed in reference to the discussion of FIG. 7. Utilizing the IRQ register 290, the UHCI 190 may cause interrupt decode 50 to generate interrupt 30 to CPU 20 via the interrupt decode unit 50 as if generated by a PS/2 keyboard 140 or PS/2 mouse 130.

Figure 7:
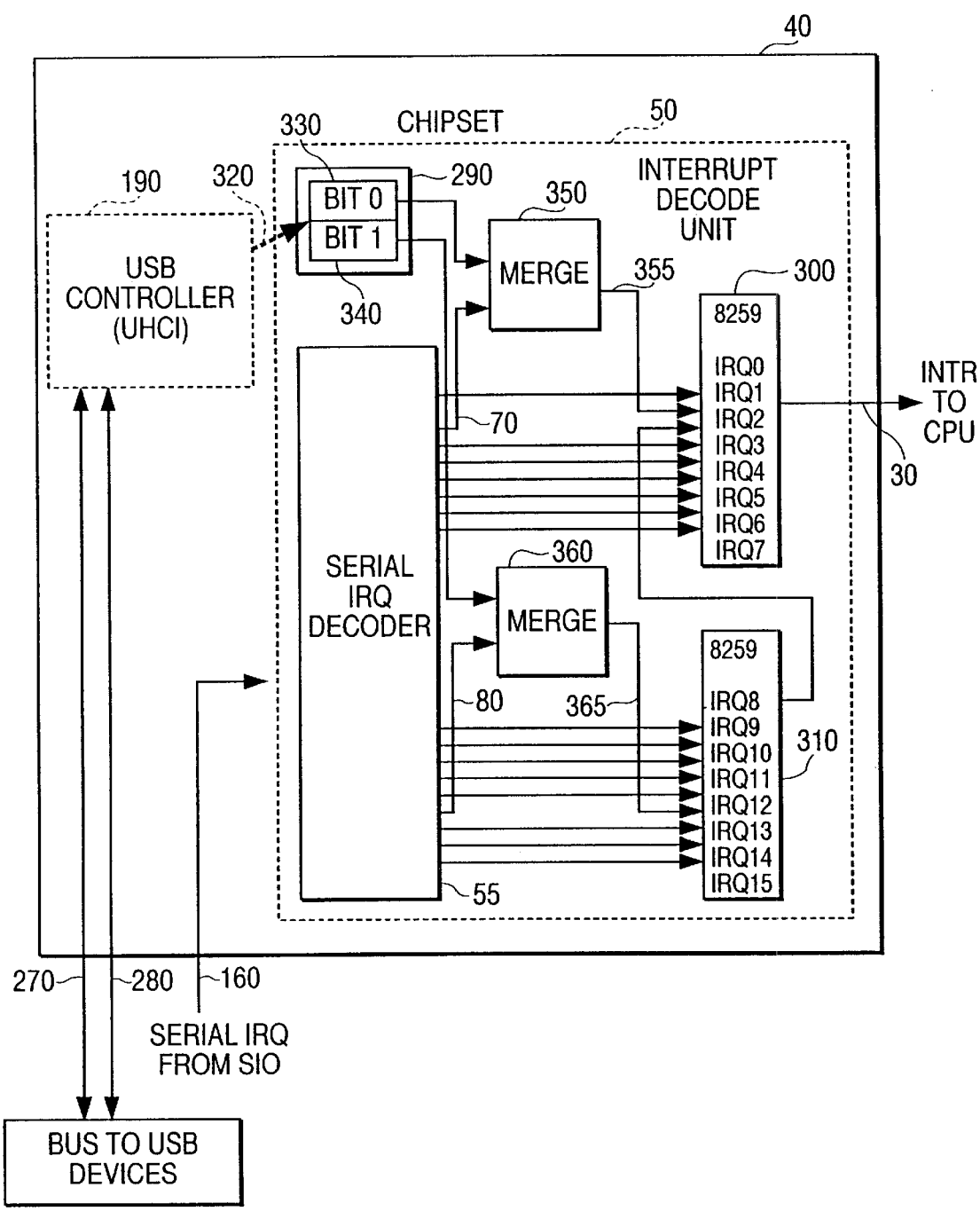
FIG. 7 is a diagram showing further detail of the chip set and the interrupt decode unit shown in FIG. 6 in an embodiment of the present invention.

FIG. 7 is a diagram showing further detail of the example chip set 40 shown in FIG. 6 in an example embodiment of the present invention. Specifically, UHCI 190 is shown in communication with a USB using a first USB link 270 and a second USB link 280. This USB may have a USB mouse 250 and a USB keyboard 240 connected thereto, as shown in FIG. 6. Upon the pressing of a key on USB keyboard 240 shown in FIG. 6, UHCI 190 shown in FIG. 7 may set a first bit, referred to as a bit 0 330, in IRQ register 290 to one (high). This bit 0 330 may be input to a first merge unit 350 along with IRQ1 link 70 from serial IRQ decoder unit 55. First merge unit 350 may be an OR gate circuit in which, if either bit 0 330 is set to one (high) or IRQ1 link 70 is set to one (high), then combined IRQ1 signal 355 may be set to one (high). In this example embodiment of the present invention, no 8×42 chip 90 is provided on the SIO chip 150 so that no PS/2 mouse 130 of PS/2 keyboard 140 may be connected in the aforementioned manner. Therefore, IRQ1 link 70 is always set to zero (low) in this embodiment.

However, since first merge unit 350 may be an OR gate, combined IRQ1 355 may be set to one (high) when bit 0 330 of IRQ register 290 is set to one (high). Thereafter, first 8259 chip 300 may detect that combined IRQ1 355 is set to one (high) and may generate an interrupt 30 to CPU 20.

In the case where USB mouse 250, shown in FIG. 6, is moved, UHCI 190 sets a second bit referred to as a bit 1 340 to one (high). This bit 1 340 may be input to second merge unit 360 along with IRQ12 link 80 from serial IRQ decoder unit 55. Second merge unit 360 may be an OR gate circuit in which, if either bit 1 340 is set to one (high) or IRQ12 link 80 is set to one (high), then combined IRQ12 signal 365 may be set to one (high). In this example embodiment of the present invention, no 8×42 chip 90 is provided on SO chip 150 so that no PS/2 mouse 130 or PS/2 keyboard 140 may be connected in the aforementioned manner. Therefore, IRQ12 link 80 is always set to zero (low) in this embodiment. However, since second merge unit 360 may be an OR gate, combined IRQ1 365 may be set to one (high) when bit 1 340 of IRQ register 290 is set to one (high). Thereafter, second 8259 chip 310 may detect that combined IRQ12 365 is set to one (high) and may indicate so to first 8259 chip 300 which in turn may generate an interrupt 30 to CPU 20.

Figure 8:
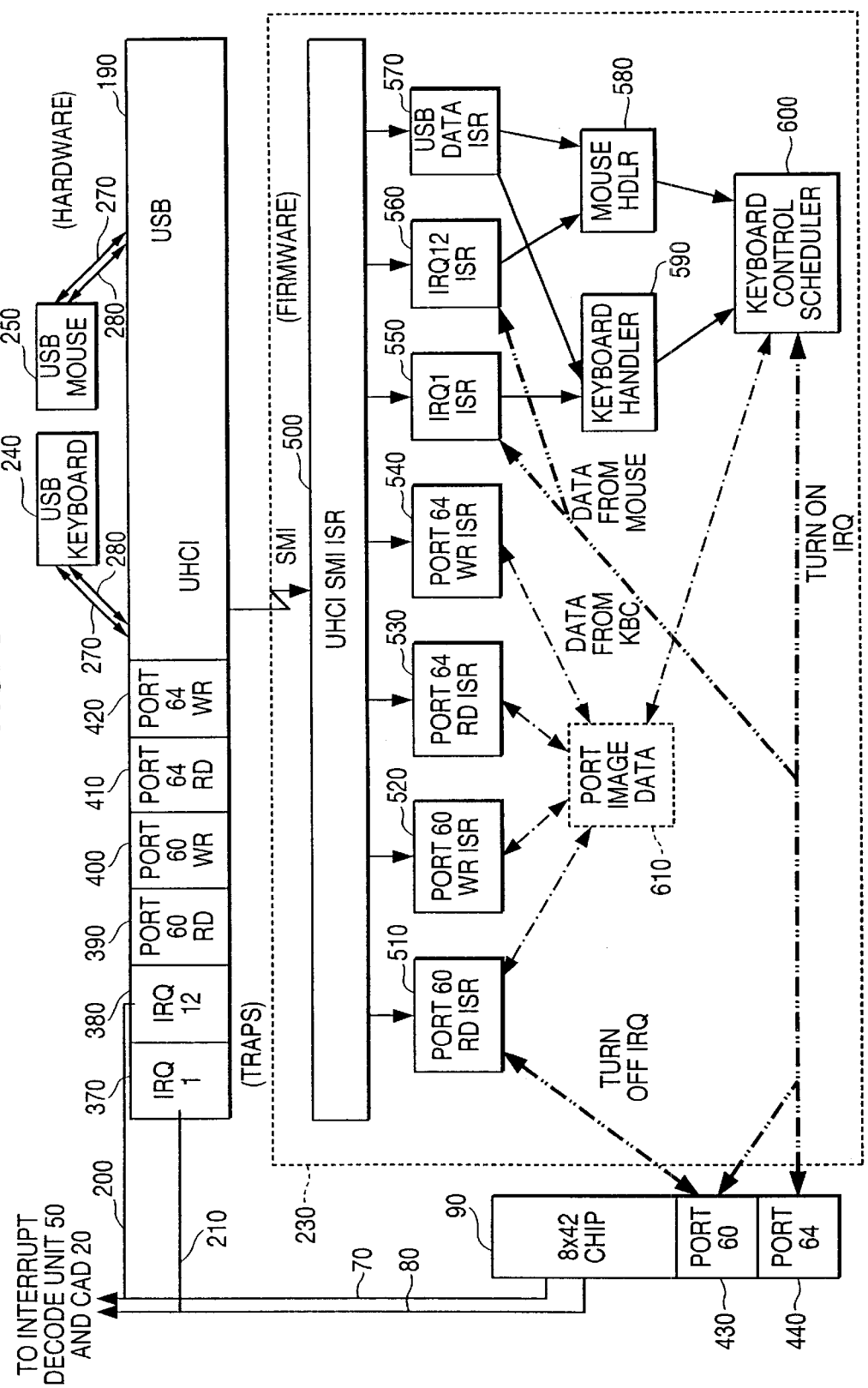
FIG. 8 is a system diagram showing the communications between software modules and the hardware shown in FIG. 4 and FIG. 5.
Figure 10:
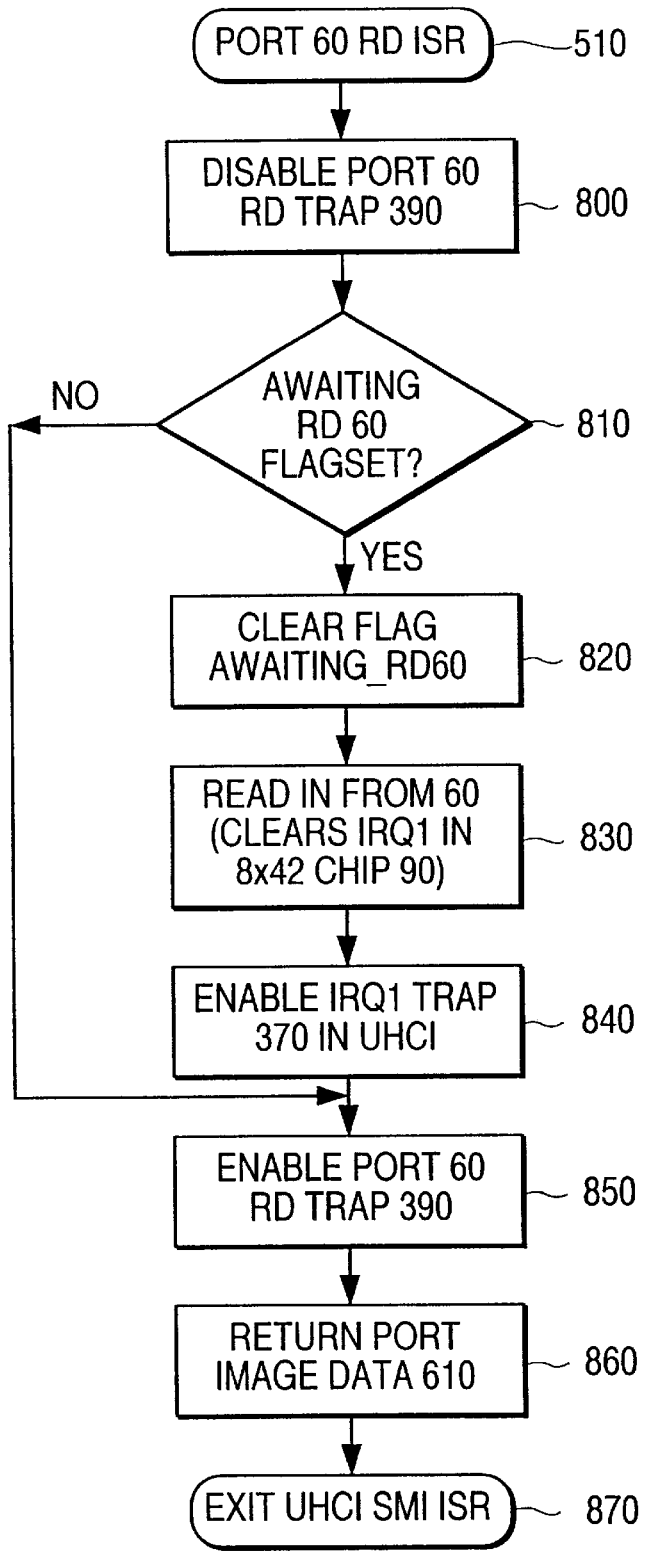
FIG. 10 is a flowchart of the operations performed by the port 60 read (RD) interrupt service routine (ISR) module shown in FIG. 8 as implemented on the computer base board shown in FIG. 4.
Figure 11:
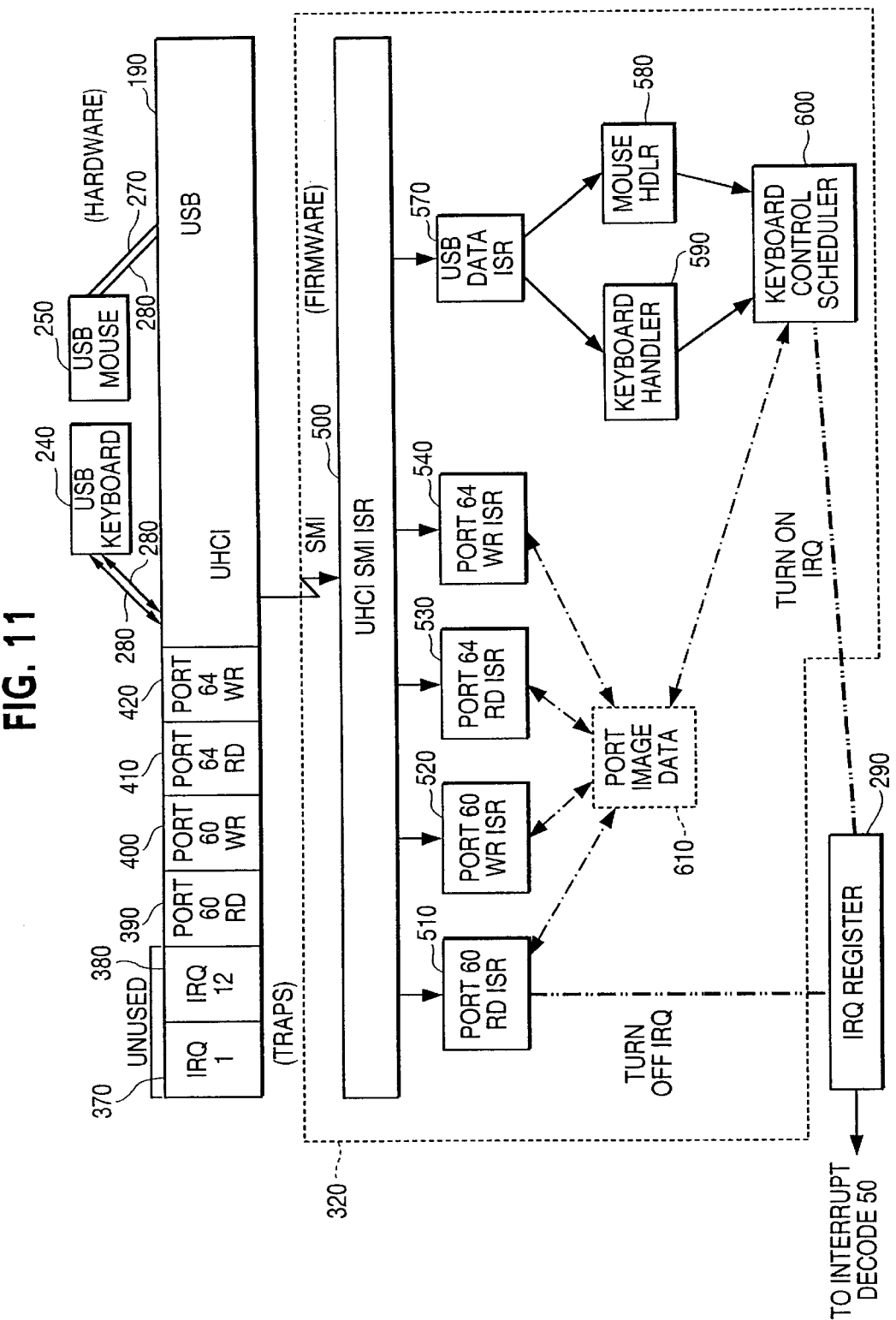
FIG. 11 is a system diagram showing the communications between software modules and the hardware shown in FIG. 6 and FIG. 7 in an embodiment of the present invention.

In the discussion of the embodiments of the present invention provided heretofore, only reference has been made to the hardware components utilized. FIGS. 9, 10, 12 and 13 are flowcharts of the software or firmware used by embodiments of the present invention with FIGS. 8 and 11 illustrating the interfaces between the hardware and the software. Specifically, the flowcharts shown in FIGS. 9 and 10 relate to the systems diagrams shown in FIGS. 4 and 5 with FIG. 8 showing the interfaces between the hardware and the software modules. Further, the flowcharts shown in FIGS. 12 and 13 relate to the systems diagrams shown in FIGS. 6 and 7, with FIG. 11 showing the interfaces between the hardware and the software modules.

Referring to FIG. 8, the USB mouse 250 and USB keyboard 240 may be connected to UHCI 190 via first USB link 270 and second USB link 280, as also shown in FIG. 4. UHCI 190 uses logical flow 230, shown in FIG. 4 and FIG. 8, which may be embedded as firmware or software in the computer base board 10, to communicate with the 8×42 chip 90. This logical flow 230 firmware may be stored in RAM (random access memory), ROM (read-only memory), PROM (programmable read-only memory), EPROM (erasable programmable read-only memory), or any other suitable form of storage on the computer base board 10 or elsewhere in the computer system. The logical flow 230 may be software executed by the CPU (processor) 20 and may communicate with the 8×42 chip 90 through ports designated by hexadecimal numbers. The 8×42 chip 90 may have up to four ports, a read and a write port for the PS/2 mouse 130, and a read and a write port for PS/2 keyboard 140. However, for the sake of simplicity, the read and write ports are combined into a single port designated as 8×42 port 60 430 and 8×42 chip 64 440, as shown in FIG. 8. Using these ports the 8×42 chip 90 may provide status when CPU 20 attempts to read 8×42 port 64 440, may receive commands when processor 20 writes to 8×42 port 64 440, may provide data from keyboard 140 or mouse 130 when processor 20 reads 8×42 port 60 430, and may receive data when processor 20 writes to 8×42 port 60. As the effort here is to emulate the keyboard controller, these ports must be emulated. For example, data from USB keyboard 240 and USB mouse 250 must appear to be returned via 8×42 port 60 430. In order to accomplish this, port 60 read trap 390, port 60 write trap 400, port 64 read trap 410, and port 64 write trap 420 may cause a system management interrupt (SMI) 25, shown in FIGS. 4, 6, 8, and 11, when the processor 20 attempts to perform the corresponding operation. For example, if the processor 20 attempts to read data from 8×42 chip 90, that is done via a read from 8×42 port 60 430. If the logical flow 230 has enabled the IRQ1 trap 370, the attempt to read data by processor 20 will cause a SMI 25 causing the processor 20 to enter logical flow 230. IRQ1 trap 370 and IRQ12 trap 380 are also necessary, as it is necessary for logical flow 230 to merge the streams of data from the USB keyboard 240 and USB mouse 250 with that from the PS/2 mouse 130 and PS/2 keyboard 140.

The UHCI 190 communicates with the logical flow 230 via the I/O ports and memory addresses (port 60 read trap 390, port 60 write trap 400, port 64 read trap 410, and port 64 write trap 420), as previously discussed. These port and memory addresses may not be at fixed locations. For example, when a key is pressed on keyboard 240, data is communicated from the keyboard 240 to the UHCI 190. The UHCI 190 saves the data in memory and causes an interrupt known as a SMI 25. This activates UHCI SMI Interrupt Service Routine (ISR) 500. Once UHCI SMI ISR 500 is activated, UHCI SMI ISR 500 first determines the type of interrupt that was generated and by which device. In this example, it would be USB keyboard 240. The data from the USB keyboard 240 may be routed to the USB data ISR 570 by the UHCI SMI ISR 500. The USB data ISR 570, in conjunction with IRQ1 ISR 550 and IRQ12 ISR 560, determines that the data is from the USB keyboard 240 and routes that data to the keyboard handler 590, which in turn passes that to the keyboard control scheduler 600. The keyboard control scheduler 600 determines if the CPU 20 has retrieved any prior data. If the CPU 20 has retrieved the prior data or if there is no prior data, then the keyboard control scheduler 600 may write the data to port 60 430 which causes the 8×42 chip 90 to set IRQ1 link 70 to one (high), which in turn interrupts the CPU 20 via interrupt 30. Via this mechanism, the USB keyboard 240 generates an interrupt 30 to CPU 20 as if a key on a PS/2 keyboard 140 were pressed. Further detail of the operation of keyboard control scheduler 600 is provided in reference to FIG. 9, which is discussed further ahead.

The foregoing discussion was made in reference to generation of an interrupt for the USB keyboard 240; however, a similar operation may occur for the generation of an interrupt for a USB mouse 250 with a few notable exceptions. First, three bytes of data are normally transmitted by a USB mouse 250. Second, a mouse handler 580 may be used instead of keyboard handler 590. Also, IRQ12 trap 380 may be used instead of IRQ1 trap 370. Further, ports with hexadecimal addresses 64 may be used instead of ports with hexadecimal addresses 60. Thus, port 64 RD 410 and port 64 WR 420 may be used instead of port 60 RD 390 and port 60 WR 400. Still, further port 64 440 may be written to rather than port 60430 which causes 8×42 chip 90 to set IRQ12 link 80 to one (high).

In order for the CPU 20 to retrieve the data sent by the USB keyboard 240, the port 60 RD ISR 510 may be used to turn off the IRQ1 link 70 in 8×42 chip 90 and disable port 60 RD trap 390 to allow the read to occur. The operation of port 60 RD ISR 510 is explained in detail with reference to FIG. 10, as discussed ahead. However, a read request may be received from the CPU 20 for USB keyboard 240 data through communications lines 15 to port 60 RD 390. This again causes activation of UHCI SMI ISR 500, which determines the nature of the interrupt received and in turn activates Port 60 RD ISR 510, which reads the data from port image data 610 and writes it to port 60 430 of the 8×42 chip 90, which causes the IRQ1 link 70 to be turned off.

In order for the CPU 20 to retrieve the data sent by the USB mouse 250, the port 64 RD ISR 530 may be used to turn off the IRQ12 link 80 in 8×42 chip 90 and disable port 60 RD trap 410 to allow the read to occur. The operation of port 64 RD ISR 530 is similar to that of port 60 RD ISR 510 and is not further detailed herein. However, a read request may be received from the CPU 20 for USB mouse 250 data through communications lines 15 to port 64 RD 410. This again causes activation of UHCI SMI ISR 500, which determines the nature of the interrupt received and in turn activates port 64 RD ISR 530, which reads the data from port image data 610 and writes it to port 64 440 of the 8×42 chip 90 which causes the IRQ12 link 80 to be turned off.

Figure 9:
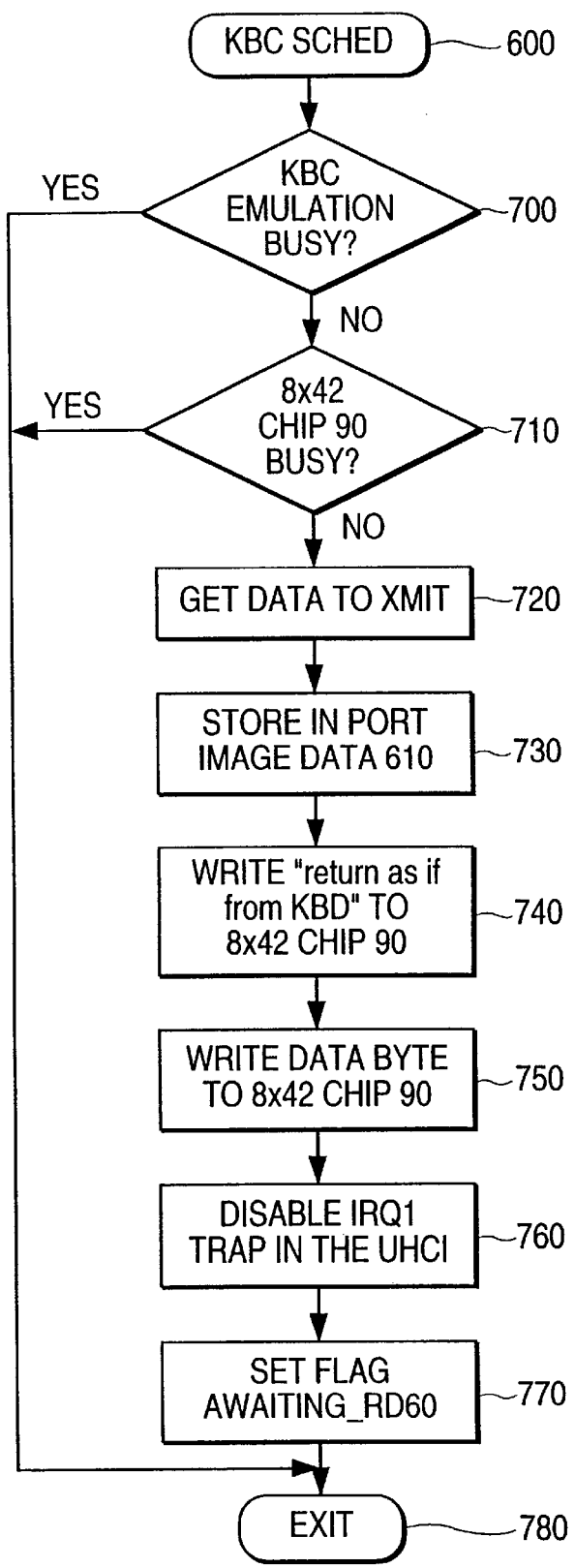
FIG. 9 is a flowchart of the operations performed by the keyboard control scheduler shown in FIG. 8 as implemented on the computer base board shown in FIG. 4.

Referring to FIG. 9, this figure details the operation of the keyboard control scheduler 600 shown in FIG. 8 which serves to receive data from the USB keyboard 240 or USB mouse 250. Upon activation of the keyboard control scheduler 600 by either the keyboard handler 590 or the mouse handler 580, the keyboard control (KBC) scheduler (SCHED) 600 first determines in operation 700 whether some other interrupt or other information is already being processed in logic flow 230. If some other interrupt is being processed or other function is being performed, then the keyboard controller (KBC) emulation is considered busy and the operation of the keyboard control scheduler 600 branches to operation 780 where it exits to be retried again later. However, if the KBC emulation is not busy then in operation 710, a determination is made if the 8×42 chip 90 is busy. Again, operation of the keyboard control scheduler 600 branches to operation 780, where it exits if 8×42 chip 90 is busy, to be retried again later. If the 8×42 chip 90 is not busy, then in operation 720, a byte of data may be taken from a port image data 610 which was placed there by the port 60 WR ISR 520 and transferred to a port image data 610 in operation 730. In operation 740, a command may be sent to the 8×42 chip 90 to treat the data about to be received as if it came from a PS/2 keyboard (KBD) 140 or PS/2 mouse 130. In operation 750, the byte of data may be taken from port image data 610 and written to port 60 430 of the 8×42 chip 90. Since the 8×42 chip 90 may now set IRQ1 link 70 to one (high) in order to generate an interrupt 30 to CPU 20, in operation 760, the IRQ1 trap 370 in the UHCI 190 may be disabled to allow IRQ1 link 70 to be set to one (high), and thus be able to interrupt the CPU 20. In operation 770, a flag called awaiting RD60 may be set to indicate that the CPU 20 has not read data from port 60 430. At this point in processing, the data has been transferred to the 8×42 chip 90, and the CPU 20 has received an interrupt 30 to indicate that data from a PS/2 keyboard 140, USB keyboard 240, PS/2 mouse 130 or USB mouse 250 has been received. Therefore, logical flow 230 exits processing in operation 780.

At this point the CPU 20 has received interrupt 30 and may request (execute a read) the data from port 60 430 in 8×42 chip 90. Referring to FIG. 10, this read by CPU 20 through communications lines 15 causes activation of port 60 RD ISR 510 in operation 510. Upon activation of port 60 RD ISR 510, port 60 RD trap 410 may be disabled in operation 800 to allow the read to proceed. In operation 810, if the awaiting RD60 flag is not set, from operation 770 of FIG. 9, then this read of port 60 430 is not the first read of port 60 430 by the CPU 20 and processing proceeds to operation 850. However, if awaiting RD60 flag is set then in operation 820 the awaiting RD60 flag may be cleared. In operation 830, a read from port 60 430 may be used to turn off IRQ1 link 70 and thus turn off the interrupt 30. However, since another byte of data may now come in from USB keyboard 240 or USB mouse 250, the IRQ1 trap 370 may be enabled to prevent 8×42 chip 90 from generating an interrupt 30 in operation 840. In operation 850, since the read is completed, port 60 RD trap 390 may be now be enabled since it was disabled to allow the read in operation 800. Then in operation 860 the context of port image data 610 may be restored. This is done in order to reestablish the pointers and registers to the condition they were in at the start of execution of the port 60 RD ISR 510 module. In operation 870, processing exits from the UHCI SMI ISR 500 module.

As would be appreciated by one of ordinary skill in the art, the foregoing description of the process to emulate interrupts of a USB keyboard 240 and USB mouse 250 so that they are treated as if generated by a PS/2 keyboard 140 and PS/2 mouse 130 using an 8×42 chip 90 and logical flow 230 is complex. Significant memory and space on the computer base board 10 must be dedicated solely to generate these interrupts.

Therefore, an example embodiment of the present invention shown in FIGS. 11–13 and implemented on the hardware shown in FIGS. 6 and 7 was created to free space on the computer base board 10 and simplify the programming required while still emulating interrupts so that the older operating systems running on such a platform can support USB keyboard 240 and USB mouse 250.

FIG. 11 is a system diagram showing the communications between software modules and the hardware shown in FIG. 6 and FIG. 7 in the example embodiment of the present invention. FIG. 11 is similar to FIG. 8 except that it is greatly simplified with many of the components shown in FIG. 8 being completely eliminated. However, this example embodiment of the present invention is able to support a USB keyboard 240 and USB mouse 250 using an older operating system such as DOS, Windows 3.1™, Windows NT™, and Windows 95™ without the need for an 8×42 chip 90 or logic flow 230. The only hardware needed is shown and previously discussed in reference to FIG. 6 and FIG. 7.

Referring to FIG. 11, IRQ register interface 320 module may be firmware or software that provides the logic needed to communicate between the UHCI 190 and the IRQ register 290. Specifically, the USB mouse 250 and USB keyboard 240 still may be connected to UHCI 190 via first USB link 270 and second USB link 280 as also shown in FIG. 6. The UHCI 190 still may have port 60 RD 390, Port 60 WR 400, port 64 RD 410, and port 64 WR 420. These ports may transfer one or more bytes of data whenever a key is pressed on the USB keyboard 240 or the USB mouse 250 is moved. However, IRQ1 trap 370 and IRQ12 trap 380 are no longer used (or can be eliminated) since there is no longer an IRQ1 link 70 and IRQ12 link 80 signal from an 8×42 chip 900 to trap. When a key is pressed on USB keyboard 240, a byte of data may be written to port 60 WR 400 of UHCI 190 which causes the UHCI 190 to generate a system management interrupt (SMI) 25 to IRQ register interface 320, which activates UHCI SMI ISR 500. Once activated, UHCI SMI ISR 500 determines the type of device that caused the data and, in this example, UHCI SMI ISR 500 activates USB data ISR 570 and port 60 WR ISR 520 that transfers the data to port image data 610. USB data ISR 570 then activates either keyboard handler 590 or mouse handler 580 depending on the nature of the interrupt. Thereafter, keyboard control scheduler 600 sets a first bit referred to as bit 0 330 to one (high) if a key on the USB keyboard 240 is pressed or a second bit referred to as bit 1 340 to one (high) if USB mouse 250 is moved. Once either bit 0 330 or bit 1 340 is set to one (high), an interrupt 30 may be generated to the CPU 20 as shown and discussed in reference to FIG. 7.

FIG. 12 provides a further detailed discussion of keyboard control scheduler 600 as implemented in FIG. 11. As should be noted the logic involved in the keyboard control scheduler 600 is significantly simplified over that shown in FIG. 9. Referring to FIG. 12, upon activation of the keyboard control scheduler 600 by either the keyboard handler 590 or the mouse handler 580, the keyboard control scheduler 600 first determines in operation 700 whether some other interrupt or other information is already being processed in IRQ register interface 320. If some other interrupt is being processed or other function is being performed then the keyboard controller (KBC) emulation is considered busy and the operation of the keyboard control scheduler 600 branches to operation 780 where it exits. However, if the KBC emulation is not busy then in operation 720 a byte of data may be taken from a port image data 610 which was placed there by the port 60 WR ISR 520 in operation 730. In operation 880, bit 0 330 or bit 1 340 may be set to one (high) which generates an interrupt 30 to CPU 20 as shown and discussed in reference to FIG. 7. In operation 770, a flag called awaiting RD60 may be set to indicate that the CPU 20 has not read data from port 60 430. At this point in processing the CPU 20 has received the interrupt 30 and there is nothing else for IRQ register interface 320 to do except exit processing in operation 780.

At this point, the CPU 20 has received interrupt 30 and has requested (executed) a read of the data from the UHCI 190. Referring to FIG. 13, this read by CPU 20 through communications lines 15 causes activation of port 60 RD ISR 510. Upon activation of port 60 RD ISR 510 a determination may be made if the awaiting RD60 flag is not set, from operation 770 of FIG. 12. If awaiting RD60 flag is not set, then this read of port 60 390 is not the first read of port 60 RD 390 by the CPU 20, and processing proceeds to operation 860. However, if awaiting RD60 flag is set, then in operation 820 the awaiting RD60 flag may be cleared. Then in operation 890, a first bit referred to as bit 0 330 in the IRQ register 290 may be set to 0 (low) in order to clear IRQ1 link 70. Then in operation 860, the context of port image data 610 may be restored. This is done in order to re-establish the pointers and registers to the condition they were in at the start of execution of the port 60 RD ISR 510. In operation 870, processing exits from the UHCI SMI ISR 500 module.

In the foregoing discussion of FIGS. 11–13, only the generation of an interrupt generated through the pressing of a key on USB keyboard 240 has been discussed. However, as would be appreciated by one of ordinary skill in the art, the same processing would be involved in generating an interrupt 30 caused by the movement of USB mouse 250. The only exception would be that port 60 RD 410 and port 64 WR 420 in the UHCI 190 may be used rather than port 60 RD 390 and port 60 WR 400. Further, port 64 RD ISR 530 and port 64 WR ISR 540 may be used rather than port 60 RD ISR 510 and port 60 WR ISR 520. Also, the second bit referred to as bit 1 340 would be set to one, instead of bit 0 330, to indicate that the USB mouse 250 was moved and thus generate an interrupt 30 to CPU 20.

Therefore, using the example embodiment of the present invention shown in FIGS. 11–13 and implemented on the hardware shown in FIGS. 6 and 7 will free space on the computer base board 10 and simplify the logic involved in generating an interrupt, while still supporting. older operating systems such as DOS, Windows 3.1™, Windows NT™, and Windows 95™.

As an alternate embodiment, both a PS/2 mouse 130 and PS/2 keyboard 140 can be supported along with a USB mouse 250 and USB keyboard 240 by the present invention through the modification of the hardware shown in FIG. 6. All that is required to support a PS/2 mouse 130 and PS/2 keyboard 140 simultaneously with a USB mouse 250 and USB keyboard 240 would be to add the 8×42 chip 90 and the I/O ports 120 with the data lines 100 and clock lines 1 10. Since the merge circuit 360 functions as an OR gate and the serial IRQ decoder 55 along with the serial IRQ links 160 is still connected, a PS/2 mouse 130 and PS/2 keyboard 140 may also be able to set IRQ12 link 80 and IRQ1 link 70 to one (high) and be able to generate an interrupt 30 to CPU 20. As would be appreciated by one of ordinary skill in the art, additional logic would be required in the IRQ register interface 320 to be able to identify which type of device generated the interrupt 30. Further, only the newer operating systems such as Windows 98™ could interface to both such sets of devices at the same time.

The benefits resulting from the present invention are that older operating systems may interface and treat interrupts generated by a USB keyboard and a USB mouse as if these interrupts were generated by a PS/2 keyboard and PS/2 mouse without the need for a controller for a PS/2 keyboard or PS/2 mouse and the accompanying logic required. Thus, the space needed on a computer base board and the cost of the computer base board is greatly reduced.

While we have shown and described only a few examples herein, it is understood that numerous changes and modifications as known to those skilled in the art could be made in the computer base board 10. Therefore, we do not wish to be limited to the details shown and described herein, but intend to cover all such changes and modifications as are encompassed by the scope of the appended claims.

We claim:

1. A device to generate interrupts to a processor for an universal serial bus (USB) keyboard and an USB mouse, comprising:

a register having a first bit and a second bit;

a first merge unit connected to the first bit of the register to generate an interrupt to the processor when the first bit is set to a predetermined interrupt value;

a second merge unit connected to the second bit of the register to generate an interrupt to the processor when the second bit is set to a predetermined interrupt value; and a USB controller connected to the USB keyboard, the USB mouse and the register, wherein when a key is pressed on the USB keyboard the USB controller sets the first bit in the register to one to generate an interrupt to the processor identified by the operating system as if the interrupt was generated by the PS/2 keyboard, and when the USB mouse is moved the USB controller sets the second bit in the register to generate an interrupt to the processor identified by the operating system as if the interrupt were generated by a PS/2 mouse.

2. The device as recited in claim 1, wherein the operating system is DOS, Windows 3.1, Windows NT, or Windows 95.

3. The device as recited in claim 1, wherein the connection between the USB controller and the register is a register interface having a keyboard control scheduler, a port 60 read interrupt service routine, and a port 64 read interrupt service routine.

4. The device as recited in claim 3, wherein when the key is pressed in the USB keyboard the USB controller generates a system management interrupt to the register interface causing it to execute the keyboard control scheduler.

5. The device as recited in claim 4, wherein the keyboard control scheduler sets the first bit in the register to a predetermined interrupt value.

6. The device as recited in claim 3, wherein when the USB mouse is moved the USB controller generates a system management interrupt to the register interface causing it to execute the keyboard control scheduler.

7. The device as recited in claim 6, wherein the keyboard control scheduler sets the second bit in the register to the predetermined interrupt value.

8. The device as recited in claim 5, wherein when the processor in response to receipt of the interrupt executes a read, the register interface executes the port 60 read interrupt service routine that clears the first bit of the register to a predetermined non-interrupt value.

9. The device as recited in claim 7, wherein when the processor in response to receipt of the interrupt executes a read, the register interface executes the port 64 read interrupt service routine that clears the second bit of the register to a predetermined non-interrupt value.

10. A method of generating interrupts to a processor for an universal serial bus (USB) keyboard and an USB mouse, comprising:

detecting a pressing of a key on the USB keyboard or a movement of the USB mouse;

setting of a first bit in a register to a predetermined interrupt value when the detection of the key being pressed on the USB keyboard occurs;

setting of a second bit in the register to a predetermined interrupt value when the detection of the movement of the USB mouse occurs;

generating an interrupt to the operating system of the processor when either the first bit or the second bit is set, wherein the interrupt generated is viewed by the operating system as identical to an interrupt that would be generated if the USB keyboard were a PS/2 keyboard or the USB mouse were a PS/2 mouse; and requesting a read by the operating system when the operating system receives the interrupt which clears the interrupt.

11. The method as recited in claim 10, wherein the operating system is DOS, Windows 3.1, Windows NT, or Windows 95.

12. The method as recited in claim 10, wherein the interrupt is generated when the first bit is set is generated by a first merge unit.

13. The method as recited in claim 10, wherein the interrupt is generated when the second bit is set is generated by a second merge unit.

14. A computer program executable by a computer embodied on a computer-readable medium, comprising:

a register interface to detect the pressing of a key on an universal serial bus (USB) keyboard or a movement of an USB mouse and generate an interrupt to the processor, the register interface further comprising:

a keyboard control scheduler module to set a first bit to a predetermined interrupt value in a register that generates an interrupt to the processor when the key is pressed on the USB keyboard and to set a second bit to a predetermined interrupt value in a register that generates an interrupt to the processor when the USB mouse is moved, wherein the interrupts generated are viewed by the operating system as identical to those generated by a PS/2 keyboard or a PS/2 mouse;

a port 60 read interrupt service routine to clear the first bit to a predetermined non-interrupt value in the register when the operating system executes a read in response to the interrupt; and a port 64 read interrupt service routine to clear the second bit to a predetermined non-interrupt value in the register when the operating system executes a read in response to the interrupt.

15. The computer program recited in claim 14, wherein the operating system is DOS, Windows 3.1, Windows NT, or Windows 95.

16. The computer program recited in claim 14, wherein the keyboard control scheduler module further comprises:

determining if a keyboard emulation is in progress;

retrieving data sent by the USB keyboard or USB mouse;

storing the data in a temporary storage location;

setting the first bit in the register if the key on the USB keyboard was pressed;

setting the second bit in the register if the USB mouse was moved; and setting an awaiting RD60 flag.

17. The computer program recited in claim 16, wherein the port 60 read interrupt service routine further comprises:

determining if the awaiting RD60 flag was set;

clearing the awaiting RD60 flag if it was set;

clearing the first bit in the register; and returning the data to the processor from temporary storage.

18. The computer program recited in claim 16, wherein the port 64 read interrupt service routine further comprises:

determining if the awaiting RD60 flag was set;

clearing the awaiting RD60 flag if it was set;

clearing the second bit in the register; and returning the data to the processor from temporary storage.

* * * * *